March 28, 1933.　　　B. THOMSON　　　1,903,228
FRICTIONAL GEARING
Filed Oct. 1, 1928　　　4 Sheets-Sheet 3

INVENTOR
B. THOMSON
BY
ATTORNEY

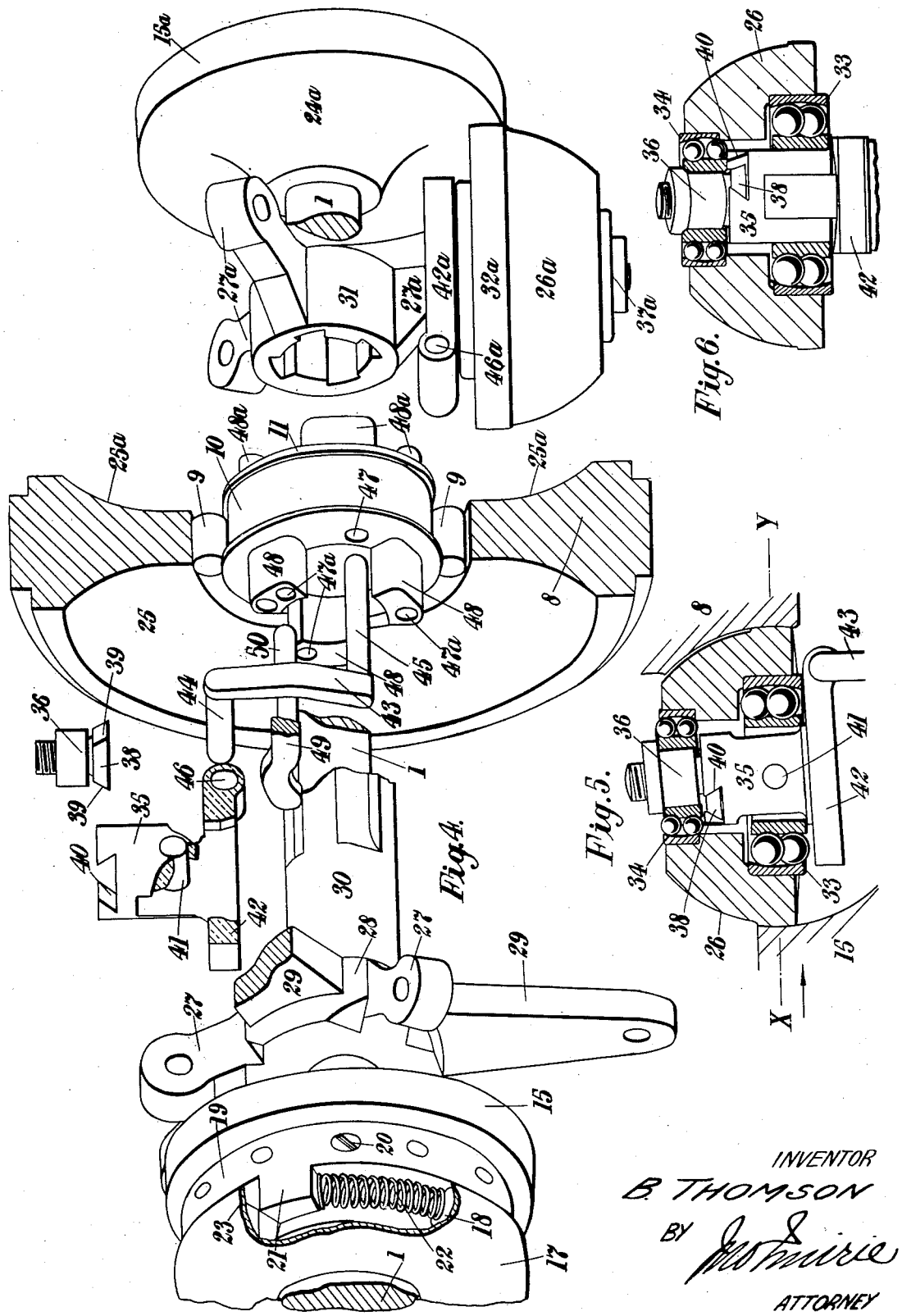

Patented Mar. 28, 1933

1,903,228

UNITED STATES PATENT OFFICE

BERNARD THOMSON, OF WOLDINGHAM, ENGLAND, ASSIGNOR TO GENERAL MOTORS CORPORATION, OF DETROIT, MICHIGAN, A CORPORATION OF DELAWARE

FRICTIONAL GEARING

Application filed October 1, 1928, Serial No. 309,650, and in Great Britain October 21, 1927.

My invention relates to friction gears, and is especially applicable to the variable types of such gears.

The object of my invention is to provide an improved form of friction gear.

Referring now to the accompanying drawings.

Figure 4 shows an inclined view illustrating separated details of the gear shown in Figure 1.

Figures 5 and 6 show cross sectional elevations at right angles to one another of one of the intermediate members illustrated in Figure 1, showing the member positioned for changing to a lower gear ratio.

Figure 7 shows a cross sectional elevation of a modified form of mounting for the intermediate members, while

In carrying the invention into effect, according to one form, and as applied by way of example to a variable speed uni-directional drive friction gear, the driving shaft, 1, Figures 1 to 4, is rotatably mounted intermediately on the ball bearing, 2, at one end of the stationary casing, 3, while the inner end of the driving shaft is rotatably mounted on the ball bearing, 4. The inner ring of the ball bearing, 2, is secured between the nut, 2b, and the shoulder, 1b, on the driving shaft, 1, while the inner ring of the ball bearing, 4, is mounted on the distance piece, 1c, on the driving shaft, 1. The outer end of the driving shaft, 1, is adapted to be coupled up to a motor or other source of power.

The outer ring of the ball bearing, 4, is carried by the casing, 5, which is integrally formed on the inner end of the driven shaft, 6, the axis of which coincides with the axis of shaft 1 extended while the casing, 5, at its outer end is mounted in the ball bearing, 7, on the stationary casing, 3, the inner end of the casing, 5, being splined on the driven member, 8, and constituting a coupling between said member and the shaft 6. The inner ring of the ball bearing, 7, is mounted on the ring, 7b, on the casing, 5, and is secured in position by the nut, 7c. The outer end of the driven shaft, 6, is adapted to be coupled up to the mechanism or machine to be driven. The driven member, 8, is rotatably mounted on rollers, 9, arranged in a race, 10, formed on the control sleeve, 11.

The driving shaft, 1, has a sleeve, 12, keyed thereon, the periphery of the sleeve being formed with a single-start left-hand semi-circular helical groove, 13, which co-acts with a similarly formed groove, 14, on the disk-like driving member, 15. Steel balls, 16, are disposed between the grooves, 13 and 14, as shown, the arrangement forming a ball thread between the parts, 12 and 15, and operating with the minimum amount of friction.

Figure 3:
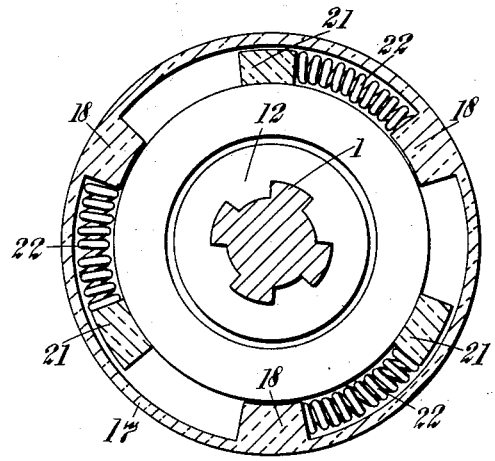
Figure 3 shows a cross section through the line III—III on Figure 1.

A disc, 17, is also keyed on the driving shaft, 1, and has a series of projections, 18, Figure 3, formed thereon. To the driving member, 15, a ring, 19, is secured by the screws, 20, and this ring is also provided with projections, 21, corresponding in number to the projections, 18, on the disc, 17. Between the projections, 18 and 21, spiral springs, 22, are interposed, the disk, 17, being provided with an overhanging rim, 23, which encloses these springs.

The driving member, 15, has a torical driving face, 24, formed thereon as a curved surface of revolution, while the driven disk-like member, 8, has a similarly formed torical face, 25, and between these faces, a set of three intermediate roller members, 26, formed of steel or other suitable material, is interposed.

The torical faces 24 and 25 are formed to contact with the traction perimeters of the members 26 in any speed ratio position of the latter.

On the opposite face of the driven member, 8, a torical face, 25a, is formed similarly to the face, 25, and between the face, 25a, and the driving face, 24a, on the driving member, 15a, a second set of intermediate roller members, 26a, similar to the members, 26, is interposed. The driving face, 24a, is similar to the driving face, 24, and the driving member, 15a, is keyed on the driving shaft, 1.

The axes of the disks with toric faces are in one straight line which coincides with the axes of shafts 1 and 6 and is the main axis of a transmission assembly. The extended axis of rotation of the intermediate roller members normally intersect the main axis during operation at any one speed ratio; and the inherent tendency of the mechanism is to maintain this relation since in that relation the center planes of said intermediate roller members are tangent to the circular paths traced by their perimeters on the toric faces of the disks, the forces interacting between the rotating disks and roller members being then in balance.

The transmission of power through the gear is divided between the driving members, 15 and 15a, which are directly connected as regards power transmission from the driving shaft, 1, the power being transmitted from the driving members through the tractive engagement of intermediate members, 26 and 26a, to opposite sides of the driven member, 8.

The intermediate members, 26, are carried on the arms, 27, of a spider, 28, the arms, 29, of this spider being anchored to the stationary casing, 3, by the screws, 60. The spider, 28, is formed with an elongated hub, 30, Figures 1 and 4, one end of which projects through the bore of the control sleeve, 11, and on this end of the hub, the spider, 31, is splined.

The control sleeve, 11, is capable of being partially rotated on the hub, 30, of the spider, 28, for the purpose of varying the gear ratio, as hereafter described, while the driving shaft, 1, is rotatable in the bore of the hub, 30.

The spider, 31, is provided with three arms, 27a, on which the intermediate members, 26a, are carried.

The arm, 27, of the spider, 28, carrying the intermediate members, 26, are arranged at angles of 120 degrees to one another, while the arms, 27a, of the spider, 31, are similarly spaced apart, the arms, 27a, however, being displaced 60 degrees relatively to the arms, 27, and are thus in staggered relation thereto.

The intermediate members, 26 and 26a, are all of similar construction and are similarly mounted on their respective spider arms, and it will be understood that the following description of one of the intermediate members, 26a, applies to all the members of this set as well as to the set of members, 26.

Similar reference numerals are used for the corresponding parts of the two sets of intermediate members, the reference numerals of the parts relating to one set being differentiated from the reference numerals of the corresponding parts of the other set by the addition of the suffix "a".

The intermediate member, 26a, shown in section in Figure, 1, is formed as a frustum of a sphere having on its outer surface a projecting tread or traction portion, 32a, the perimeter of which acts as the operative traction surface of the member and engages with the torical faces, 24a and 25a, on the driving and driven members, 15a and 8, respectively.

The intermediate member, 26a, is provided with two sets of internally disposed ball bearings, 33a and 34a, the bearing, 33a, being interposed between the intermediate member and the internal support, 35a, while the bearing, 34a, is interposed between the intermediate member and a relatively movable journal member comprising the sliding block, 36a.

The outer rings of both the ball bearings, 33a and 34a, form parts of spherical surfaces so as to permit a certain amount of angular movement of the outer and inner rings of these bearings relatively to one another.

The support, 35a, and the sliding block, 36a together constituting a composite or two-part support, are retained in position on the ball bearings, 33a and 34a, in the intermediate member, 26a, by the nut, 37a.

The block, 36a, is formed at its inner end with a base, 38a, having inclined sides, 39a, the base being adapted to slide in a correspondingly formed groove, 40a, on the head of the support, 35a. The construction of the sliding block and the support is more clearly shown in Figure 4, in which these parts for one of the corresponding set of intermediate members, 26, are illustrated. The included sides of the base 38a and groove 40a constitute a cam or inclined plane mechanism for a purpose to be set forth.

The arm, 27a, of the spider, 31, projects within the support, 35a, as shown, and to this arm the support, 35a, is pivotably attached by the pin, 41a. The base, 42a, of the support, 35, and also the cylindrical wall of this support are cut away as shown in Figure 1, and likewise as shown in Figure 4, for the corresponding support, 35, so as to permit the necessary amount of freedom of the support on the pin, 41a.

The projection of the longitudinal centre line of the groove, 40a, on the centre line of the pin, 41a, makes an angle of 45 degrees therewith, but this angle may be varied if desired.

Figure 1:
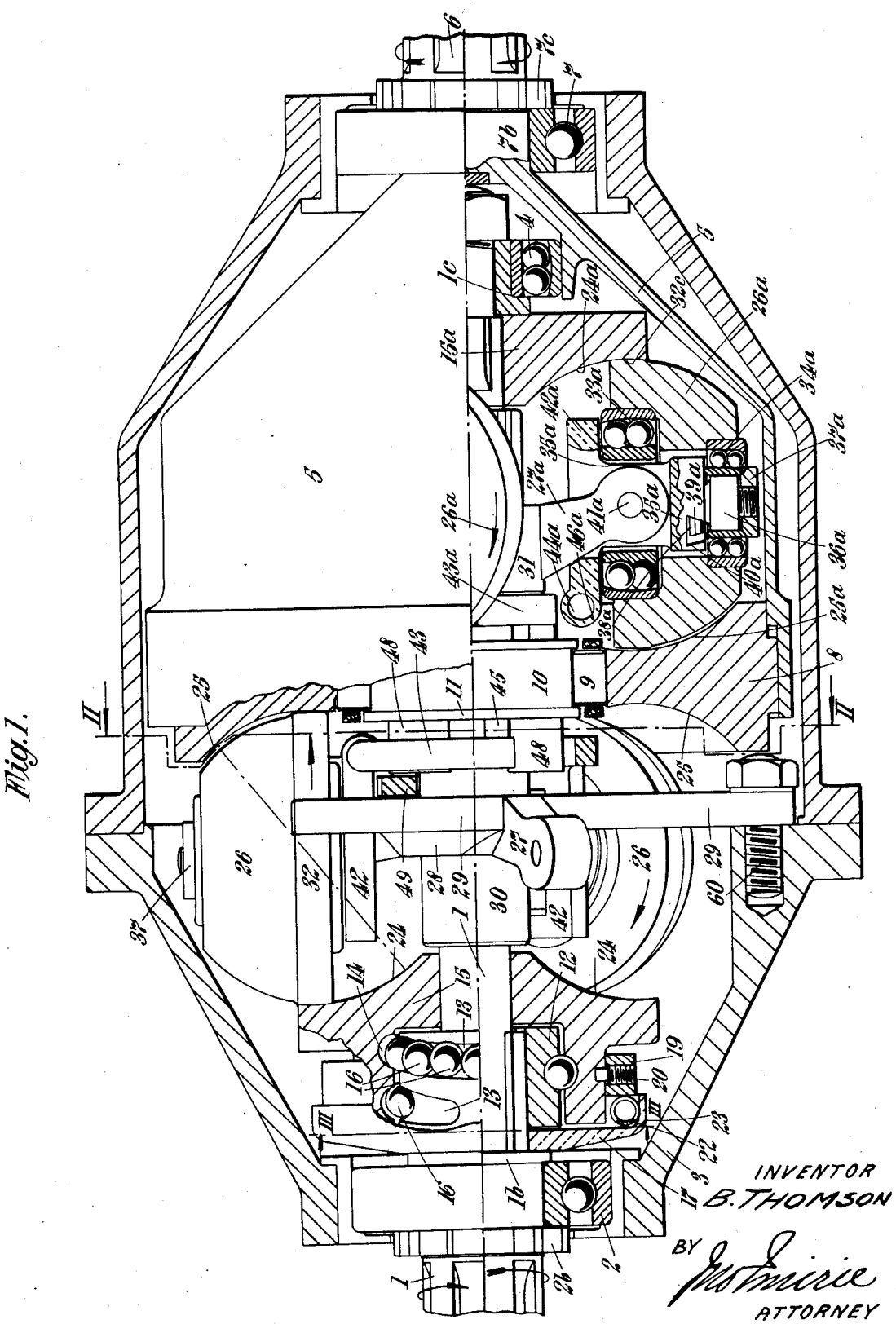
Figure 1 shows a longitudinal section through one form of friction gear, constructed according to the invention.

The centre lines of the grooves, 40a, on the supports, 35a, are oppositely inclined to the centre lines of the grooves, 40, on the supports, 35, as shown in Figures 1 and 4.

The control sleeve, 11, is operatively connected with each of the bases, 42, of the supports, 35, for the intermediate members, 26, by the links, 43. The links, 43, are formed with two pins, 44 and 45, which project from the links in directions at right angles to one another. The pins, 44, slidably and rotatably engage with the holes, 46, on the bases, 42, of the supports, 35, while the pins, 45, slidably and rotatable engage with the axial holes, 47, in the control sleeve, 11.

The control sleeve, 11, is similarly interconnected with the bases, 42a, of the supports, 35a, for the intermediate members 26a, by the links, 43a, the pins of these links which engage with the control sleeve, 11, being slidably and rotatably mounted in the axial holes, 47a, thereon.

The holes, 47, on the control sleeve, 11, and also the holes, 47a, are spaced apart at angles of 120 degrees, the set of holes, 47, however, being displaced 60 degrees relatively to the set of holes, 47a.

The control sleeve, 11, is formed with three spaced projections, 48 and 48a, on opposite sides thereof, these projections being arranged as shown to accommodate the holes, 47 and 47a, respectively, and provide the necessary length of bearing for the pins, 45 and 45a, of the links, 43 and 43a, while maintaining the overall dimensions of the mechanism within the smallest possible limits.

Figure 2:
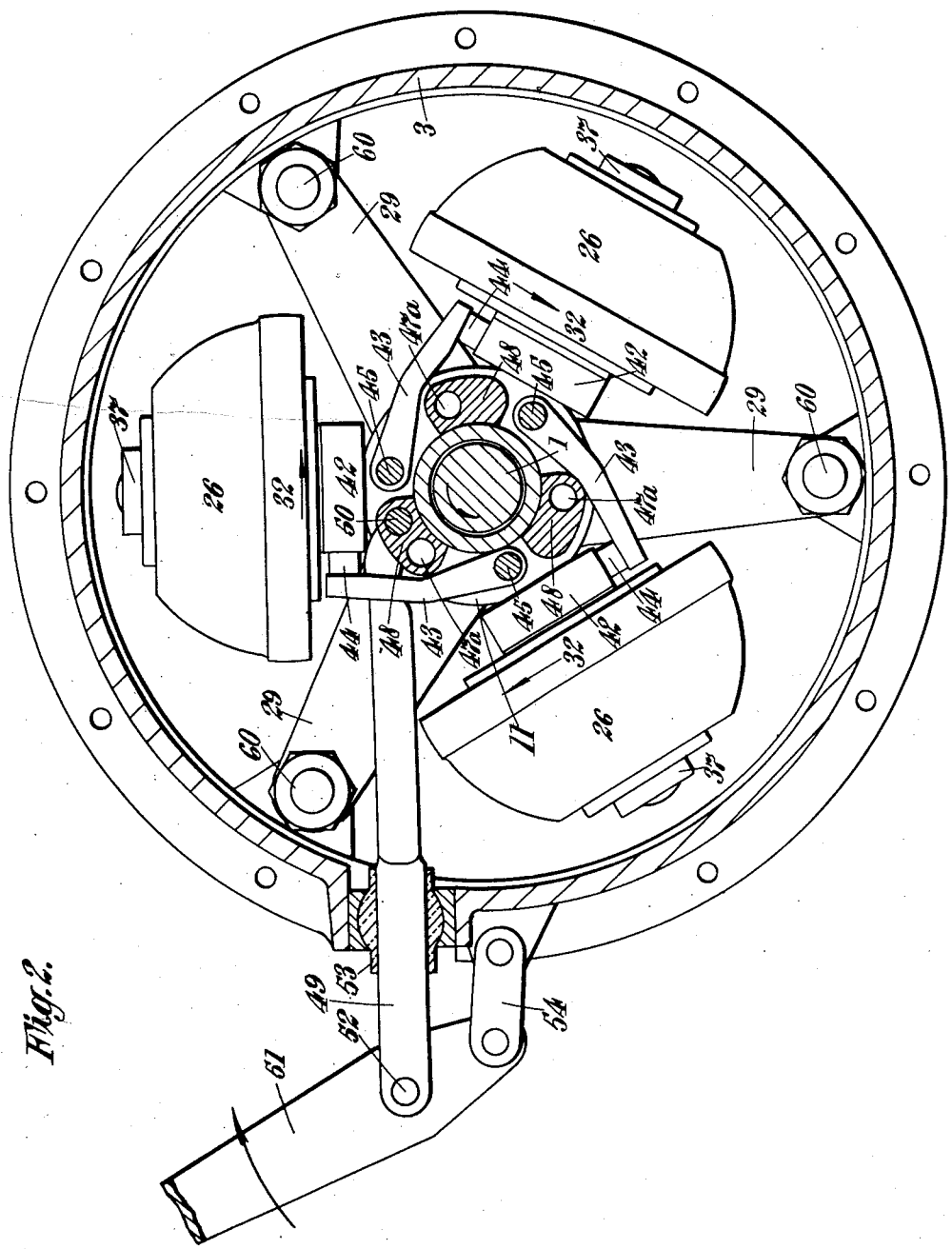
Figure 2 shows a cross section through the line II—II on Figure 1.

A link, 49, Figure 2, is connected at one of its ends to the control sleeve, 11, by means of the pin, 50, while its other end is connected to the hand lever, 51, by the pin, 52. The link, 49, is slidably mounted in a spherically mounted bush, 53, where it passes through the stationary casing, 3, while the lower end of the lever, 51, is jointed to the casing by means of the pivoted link, 54. The above arrangement provides for the angular movement of the pin, 50, about the centre of the control sleeve, 11.

From the above description, it will be evident that the driving members, 15 and 15a, are in operative power transmitting relationship with the driving shaft, 1, which is rotatably mounted in the hub, 30, of the spider, 28.

Further, as the spider, 28, is anchored to the stationary casing, 3, and the spider, 31, is splined on the hub, 30, of the spider, 28, both sets of arms, 27 and 27a, on which the intermediate members, 26 and 26a, are carried, are fixed relatively to the stationary casing, 3. Further, the control sleeve, 11, may be partially rotated on the hub, 30, of the spider, 28, by means of the hand lever, 51, while the driven member, 8, is mounted on rollers on the control sleeve, 11.

One of the functions of the ball thread arranged between the sleeve, 12, and the driving member, 15, is to act as a pressure augmenter or torque loading device for the purpose of increasing the pressure between the driving surfaces of the driving, intermediate and driven members, as will be hereinafter explained.

The interposition of the springs, 22, between the projections on the disk, 17, which is keyed on the driving shaft, 1, and the projections on the ring, 19, attached to the driving member, 15, acts to introduce an initial contact pressure between the driving, intermediate and driven members, and also to take up any backlash.

The operation of the friction gear above described is as follows:—

When the mechanism is at rest, the action of the springs, 22, tends to rotate the sleeve, 12, and the member, 15, in opposite directions to one another. Under this action and that of the thread formed by the balls, 16, and the grooves, 13 and 14, an initial contact pressure between the members, 15, 26, 8, 26a and 15a, is generated, the reaction to this pressure being an initial tension set up in the length of the driving shaft, 1, between the driving member, 15a, and the sleeve, 12.

On power being applied to the shaft, 1, in the direction of the arrow shown in Figure 1, the applied torque is transmitted partly through the balls, 16, to the driving member, 15, and partly through the driving shaft, 1, to the driving member, 15a. Owing to the inclination of the grooves, 13 and 14, to the axis of the driving shaft, 1, and the consequent inclination of the ball thread formed by the balls, 16, the force which acts upon the ball thread may be regarded as being resolved into two components, viz., a component acting longitudinally along the driving shaft, 1, and a component acting to produce rotation of the driving member, 15. The longitudinal component causes the contact pressure between the members, 15, 26, 8, 26a and 15a, to be increased over and above the initial pressure produced on these members by the action of the springs, 22. The amount of this pressure increase varies with the applied torque. Actual movement of the driving members, 15 and 15a, towards the driven member, 8, in virtue of the pressure generated by the torque as above described, can only take place consequent on the elastic deformation of the driving, intermediate or driven members, as any mechanical play has already been taken up by the action of the springs, 22, as above explained.

In the position of the parts as illustrated in Figure 1, the driven shaft, 6, rotates at the same speed and transmits the same torque theoretically as the driving shaft, 1, but the driven shaft rotates in the opposite direction to the driving shaft.

If it is assumed that the driving shaft is rotating in the direction of the arrow shown in Figure 1, while power is being transmitted by the mechanism, and it is desired to vary the ratio so that the driven shaft, 6, will rotate with diminished velocity and transmit a torque of correspondingly greater magnitude, pressure is applied to the hand lever, 51, in the direction of the arrow shown in Figure 2, so that the control sleeve tends to be rotated in a clockwise direction with reference to this figure.

The pressure on the control sleeve, 11, is transmitted by the links, 43 and 43a, to the bases, 42 and 42a, of the supports, 35 and 35a, for the intermediate members, 26 and 26a, and since the supports, 35 and 35a, are pivoted on the pins 41 and 41a, this pressure is transmitted by the grooves, 40 and 40a, to the sliding blocks, 36 and 36a, and thence through the ball bearings, 34 and 34a, to the intermediate members, 26 and 26a.

In Figures 5 and 6, one of the set of intermediate members, 26, is shown positioned for effecting the change of gear ratio above described, and the action of the mechanism while executing the change will now be explained with reference to the intermediate members shown in these figures.

The cross section of the intermediate member illustrated in Figure 6, is viewed in the direction of the arrow shown in Figure 5.

It will be understood that the remaining members of the set of intermediate members, 26, as well as the set of intermediate members, 26a, are simultaneously and similarly positioned when effecting the change of gear ratio.

In order to vary the transmission ratio it is necessary to cause the intermediate roller members to tilt, as about the axis of pins 41, so that the angle which the center plane of each roller forms with respect to the main axis becomes changed; and in the new positions assumed to effect the desired speed ratio the extended axes of the intermediate rollers must still intersect the main axis in order to maintain the new speed ratio.

Owing to the contact pressure between the intermediate member, 26, Figures 5 and 6, and the driving and driven members, 15 and 8, respectively, the intermediate member is unable to slip on the driving faces of the driving and driven members so as to respond directly to the pressure transmitted by the link, 43, by a corresponding rotational movement about the axis of the pin, 41, but this rotational movement of the intermediate member is, however, effected indirectly by suitably steering the intermediate member on the driving faces of the driving and driven members.

The steering operation of the intermediate member, 26, is effected by the transmitted pressure by the link, 43, which pressure causes a movement of the support, 35, and the sliding block, 36, on the ball bearings, 33 and 34, relatively to the intermediate member, 26, as shown in Figures 5 and 6. The inclination of the groove, 40, to the axis of the pin, 41, defines the direction of the pressure which is transmitted by the support, 35, to the sliding block, 36, and from the latter through the ball bearing, 34, to the intermediate member, 26. The direction of this pressure is such as to cause the intermediate member, 26, to be inclined about the axis, X—Y, on Figure 5, that is about an axis coincident with the line joining the points of contact of the intermediate member with the driving and driven members, 15 and 8, respectively.

By reason of the inclination thus imparted to the intermediate roller members their axes of rotation are moved so that extensions of said axes pass to one side of the main axis; and in this position the forces interacting between the rotating disk-like member and the intermediate roller members are unbalanced and impart directly the requisite tilting movement of the rolls by causing them to travel in spiral paths on the toric surfaces until the forces that cause the inclination again balance whereupon the intermediate roller members again assume a position with their extended axes again intersecting the main axis.

The direction of the inclining movement is shown in Figure 6, and is such that the rolling paths of the intermediate member, 26, on the driving faces of the driving and driven members, 15 and 8, respectively, change from circular to spiral paths, the spiral path on the driving member gradually diminishing in radius while the spiral path on the driven member gradually increases in radius.

The intermediate member, 26, continues to roll on the spiral paths above described so long as pressure is applied to the hand lever, 51, the control sleeve, 11, and the link, 43, following up the movement of the intermediate member.

When the pressure on the hand lever, 51, is released, the intermediate member, 26, automatically positions itself so that its rolling paths on the driving faces of the driving and driven members change back to circular paths, the radii of the circular paths corresponding to the points on the helical paths to which the points of contact of the intermediate member had attained at the instant when the pressure on the hand lever was released.

To increase the gear ratio from that attained as above described, pressure is exerted on the hand lever, 51, in the opposite direction to that indicated by the arrow on Figure 2, so that the pressure when transmitted by the link, 43, and the support, 35, causes the intermediate member, 26, to be inclined about an axis coincident with the line joining its points of contact with the driving faces of the driving and driven members, but in the opposite direction to that above described, with the result that the rolling paths of the intermediate member on the driving faces of the driving and driven members are changed from circular to spiral paths, the spiral path on the driving member gradually increasing in radius, while that on the driven member gradually decreases in radius until the intermediate member is positioned for the desired gear ratio, when the pressure on the hand lever is released as before.

The above arrangement enables the gear ratios to be readily varied without releasing the pressure on the driving faces or otherwise interrupting the operation of the mechanism.

As an alternative method to that above described for effecting the variation of gear ratios, I may connect the power unit to the driving shaft by means of a clutch, and provide means for causing the springs, 22, to be retracted so as to relieve the contact pressure on the driving faces. When it is desired to change the gear ratio, the power unit is declutched from the driving shaft, 1, and the springs, 22, are retracted. The hand lever, 51, may then be actuated to rotate the intermediate members, 26 and 26a, on the pins, 41 and 41a, respectively, to an amount corresponding to the desired change of gear ratio, after which the driving shaft, 1, is clutched to the power unit and the springs, 22, released, when the ball thread forces the driving faces of the driving, intermediate and driven members into operative contact again.

In the mechanism above described, for augmenting or generating pressure between the driving faces of the members of the gear, the reaction of the pressure places the driving shaft under tension, and the greater the torque applied to the driving shaft, the greater is the pressure on the driving faces, while the formation of the intermediate members as frusta of spheres enables these members to support very heavy pressures and at the same time permit relatively large ball bearings to be assembled therewith, so that torques of large magnitude may be transmitted in an efficient manner.

Any other form of mechanism may be used for generating or augmenting the pressure on the driving faces of the members of the gear.

Also, an additional device for augmenting or generating the pressure on the driving faces of the members of the gear may be incorporated in the driving member, 15a.

Further, in some cases, I may provide an additional device for augmenting or generating contact pressure between the members of the gear, on one or both of the driving members, so as to maintain the contact pressure between the members of the gear when the torque is reversed without the reversal of direction of rotation, as in the case of a motor vehicle proceeding down an incline with the engine acting as a brake, in which case the functions of the driving and driven members are interchanged.

Figure 7:
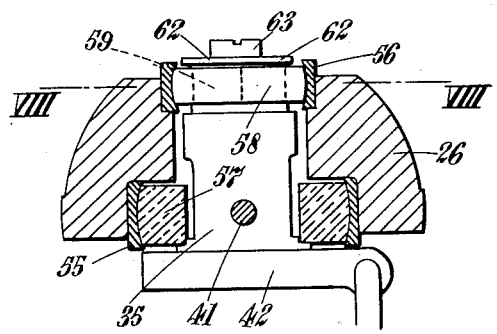
Figure 8:
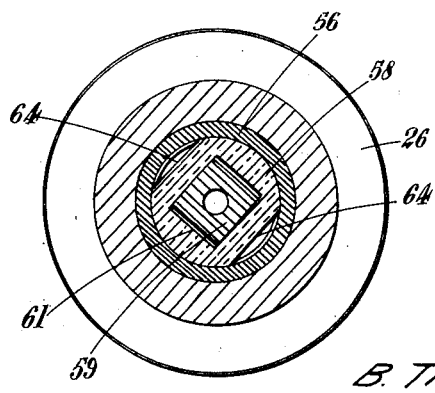
Figure 8 shows a cross sectional elevation through the line VIII—VIII on Figure 7.

In Figures 7 and 8, a modified form of mounting for the intermediate members is illustrated. In these figures, the intermediate members, 26, are provided with bearing rings, 55 and 56, the inner surfaces of which are parts of spherical surfaces, and on these surfaces correspondingly formed surfaces on the blocks, 57 and 58, bear. The support, 35, extends through both blocks, 57 and 58, the head, 59, of the support being rectangular in cross section and engaging with a correspondingly formed slot, 61, in the bearing block, 58. One of the diagonals of the slot, 61, and the head, 59, is parallel to the axis of the pin, 41. The washer, 62, and the screw, 63, retain the parts in position.

The block, 58, is formed with oppositely disposed flats, 64, so as to enable the block to be assembled with the ring, 56, while the block, 57, is similarly formed, although not shown, for assembly with the ring, 55.

Although it has been assumed in the foregoing description of construction and mode of operation that shaft 1 and members 15 and 15a are power input elements, while shaft 6 and member 8 are power output elements, it is evident that the assembly may be used in the reverse manner adopting shaft 6 and member 8 as the power input elements.

By means of my invention, it will be seen that an efficient form of friction gear is provided, by means of which heavy torques may be transmitted in an efficient manner and without the necessity of providing thrust and other forms of bearings for absorbing the contact pressure, while the gear ratios may be readily varied as required.

Modifications may be made in detail and arrangement of the examples of my invention hereinbefore described.

I claim:—

1. In friction gearing, a shaft, disk-like members coaxially arranged in relation to said shaft and acting as driving and driven members, one of said members being connected to said shaft to rotate therewith and another being rotatable relatively thereto, intermediate roller members between said disk-like members, a spider, the arms of which space said roller members, said spider having a hub concentric with said shaft and relatively rotatable disk-like member, a control sleeve concentric with said shaft and passing thru said relatively rotatable disk-like member, means coacting with said sleeve for positioning said intermediate roller members to vary the gear ratio, and means for moving said sleeve in order to effect a ratio change.

2. In friction gearing, a shaft, a double faced power transmitting disk coaxially arranged and rotatable in relation to said shaft, other power transmitting disks connected to said shaft to rotate therewith on opposite sides of said double faced disk, intermediate rollers between said disks, a spider, the arms of which position said roller members, said spider having a hub concentric with said shaft and double faced disk, a sleeve concentric with said shaft and passing thru said double faced disk about which the latter rotates, and means coacting with said sleeve and said intermediate rollers to vary the gear ratio.

3. In friction gearing, a shaft, a double faced power transmitting disk coaxially arranged and rotatable in relation to said shaft, other power transmitting disks connected to and rotatable with said shafts on opposite sides of said double faced disk, intermediate rollers between said disks, a sleeve member between said shaft and said double faced disk, links between said intermediate rollers and said sleeve, and means for operating said sleeve to position said intermediate rollers to vary the gear ratio.

4. In friction gearing, a shaft, a double faced power transmitting disk coaxially arranged and rotatable in relation to said shaft, other power transmitting disks connected to and rotating with said shaft on opposite sides of said double faced disk, intermediate rollers between said disks, fixed positioning means for the rollers, a sleeve member between said shaft and said double faced disk around which the latter rotates, means for interconnecting said sleeve and said intermediate rollers and means for rotating said sleeve to position said intermediate rollers to vary the gear ratio.

5. In friction gearing, a gear casing, coaxially arranged disk-like driving and driven members, intermediate rollers between said driving and driven members, means for supporting said rollers including a central hub passing thru one of said disk-like members fixed to the casing and radiating arms to which the rollers are attached, a central control device coaxial with said hub, and passing thru the same disk-like member, means connecting the central control device and said rollers for effecting ratio adjustment of the rollers, and means for moving said central control device.

6. In friction gearing, a shaft, a double faced disk-like member coaxially disposed and rotatable in relation to said shaft, disk-like members connected to and rotatable with said shaft on opposite sides of said double faced disk-like member, intermediate roller members between said disk-like members, means for supporting said roller members, said means comprising a hub concentric with said shaft and double faced disk, means including a central sleeve about which said double faced disk rotates, for inclining said intermediate roller members about axes passing thru their points of contact with said disk-like members.

7. In friction gearing, a shaft, disk-like driving and driven members coaxially arranged in relation to said shaft, one of which is rotatable with respect thereto, a ball thread connection between the said other disk-like member and said shaft and intermediate roller members disposed between said driving and driven members.

8. In friction gearing, a shaft, a disk-like member coaxially arranged and rotatable in relation to said shaft, other disk-like members connected to said shaft to rotate therewith disposed on opposite sides of said relatively rotatable disk-like member, one of said shaft connected members having a helical groove, a sleeve keyed to the shaft between the latter and said grooved member, said sleeve having a helical groove coacting with said helical groove on said grooved member, balls engaging said grooves and intermediate rollers interposed between said disk-like members.

9. In friction gearing, a disk-like driven member, a disk-like driving member arranged coaxially in relation to said driven member, intermediate roller members between the said driving and driven members, relatively movable two-part supports for said intermediate roller members, interconnecting means between the elements of said two-part supports whereby movement of one in one plane causes the other to move in another plane substantially perpendicular thereto, bearings between said supports and said intermediate roller members on which said supports are pivoted, a sleeve coaxially arranged in relation to one of said disk-like members, links interconnecting said supports and said sleeve, and means for angularly moving said sleeve to vary the gear ratio.

10. In friction gearing, a casing, a driving and a driven shaft rotatively mounted in said casing in axial alinement, a double faced disk-like member coupled to one shaft and surrounding the other shaft, disk-like members connected to said other shaft to rotate therewith at opposite sides of said double faced member, intermediate roller members between said disk-like members, relatively slidable outer and inner supporting members for said intermediate roller members, bearings at least one of which is spherical between said intermediate roller members and said supporting members, spider members thru which said shaft extends anchored to said casing, a control sleeve coaxial with said double faced disk-like member around which the latter rotates, links interconnecting said supporting members and said control sleeve, and means for operating said control sleeve to vary the gear ratio.

11. In friction gearing, a shaft, disk-like driving and driven members coaxial therewith, one of which is rotatable with respect to said shaft, intermediate roller members between said driving and driven members, a spring drive between said shaft and one of said disk-like members, and a ball thread interconnecting said last mentioned disk-like member and said shaft.

12. In friction gearing the combination of a shaft having a disk-like member connected thereto to rotate therewith; a coaxial disk-like member adapted to rotate relatively to the shaft; a casing; a spider having a sleeve-like hub permanently anchored at one end to the casing and extending through said relatively rotatable disk-like member between it and the shaft, radiating arms, having unsupported extremities, between said disk-like members and rollers positioned at and rotatable around the extremities of the arms, for transmitting rotary motion between the disk-like members.

13. A shaft having two axially spaced disk-like members connected thereto to rotate therewith; a coaxial disk-like member disposed between said two disk-like members and adapted to rotate relatively to said shaft; a casing; a spider having a sleeve like hub permanently anchored at one end to the casing and extending thru said relatively rotatable disk-like member between it and the shaft, radiating arms having unsupported extremities on each end of the hub between said disk-like members, and rollers positioned at and rotatable around the extremities of the arms for transmitting rotary motion between the disk-like members connected to rotate with the shaft and the member rotatable with respect thereto.

14. In friction gearing a shaft, two disk-like members connected thereto so as to rotate therewith, an intermediate disk-like member rotatable about said shaft; rollers disposed between said intermediate disk-like member and said other disk-like members adapted to transmit rotary motion from one to another; supporting means for said rollers; means adapted to change the position of said rollers for varying the speed, said means including a control sleeve concentric with said shaft and passing concentrically thru said intermediate disk-like member, and means at each end of the sleeve for controlling the speed ratio position of said rollers.

15. In friction gearing the combination of a rotatable disk-like driving member; a roller the axis of which normally intersects the line of the axis of said driving member, and means for keeping the periphery of said roller tractively engaging the driving face of the driving member; means for supporting said roller comprising a two part support on which said roller is rotatably mounted, one part of said support being movable in a plane including the axis of the driving disk and the axis of said roller, the other part of said two part support comprising a journal for said roller susceptible of bodily movement transversely of said plane, and means connecting the journal comprising part to the first named part of the support adapted to cause a movement of the journal comprising part in response to movement imparted to the support, thereby moving the roller to a position in which its axis passes to one side of the line of said disk axis.

16. In friction gearing a shaft, a driven and a driving disk concentric with said shaft, rollers disposed between said disks with their axes normally intersecting the axis of said shaft, said rollers being adapted to transmit the movement of one disk to the other, and means to press said disks toward each other into tractive contact with the rollers; supports for said rollers on which said rollers are severally rotatably mounted, said supports being movable in planes including the axis of said shaft and the axis of the roller in its normal position, said supports severally carrying a journal part susceptible of bodily movement transversely of said plane and means whereby movement imparted to the supports in said plane imparts movement to said journal part transversely thereof.

17. In friction gearing a shaft, a driving and a driven disk coaxial therewith, rollers between said disk with their axes normally intersecting the shaft axis and means for pressing said disks toward each other into tractive contact with the rollers; supporting means for the rollers including a journal member susceptible of limited movement transversely of its axis relative to the main part of the support; means for moving the support in a plane that includes the axis of the disk and the normal axis of the roller, and means including a cam connection between the journal member and main portion of the support whereby movement of the support imparts a movement to the journal member in a direction to displace the roller axis so that it is directed to one side of the shaft axis.

18. In friction gearing, a shaft; a disk coaxial therewith but rotatable independently thereof, a second coaxial disk spaced from the first named disk, rollers between said disks, means tending to press said disks against the roller treads, said means comprising cooperative helical surfaces on said second disk and a part rigid with the shaft so disposed as to cause a relative axial movement of the disk and shaft in response to relative rotation thereof and springs arranged to transmit the torque of one to the other elastically.

19. In friction gearing, a shaft; two disks spaced apart connected to said shaft to rotate therewith, an intermediate coaxial disk rotatable about the shaft, intermediate rollers between the disks in tractive contact therewith; a tubular hub surrounding the shaft, said hub having arms each provided at its end with supporting means for a roller about which the roller rotates, a roller control sleeve surrounding said hub within the intermediate coaxial disk, means to impart movement of said control sleeve to the roller supporting means to effect change in ratio position and means for moving said control sleeve.

20. In friction gearing, two alined shafts, two disks spaced apart connected to one of said shafts to rotate therewith, an intermediate coaxial disk rotatable about the last named shaft, intermediate rollers between the disks in tractive contact therewith, a tubular hub surrounding the last named shaft, said hub having arms at each end for positioning the rollers, a roller control sleeve surrounding said hub within said intermediate disk, means to move said control sleeve, means connected to the control sleeve to impart ratio changing movement to the rollers, and a coupling constituting a driving connection between said intermediate disk and the other shaft.

21. In friction gearing, a driving and a driven disk in axial alinement; an intermediate roller and means for supporting it in tractive contact with both disks so that its axis, normally lying in a plane including the disk axis and roller center, may be shifted out of said plane, and may also change its angular relation to the disk axis; means for forcibly shifting said roller axis out of said plane, said means comprising a first part movable substantially in said plane and a second part movable bodily transversely of said plane arranged to apply force to the roller; means intermediate said parts to translate the movement of the first part to said movement of the second part, and means to operate said first part.

22. In friction gearing, a driving and a driven disk in axial alinement; an intermediate roller and means for supporting it in tractive contact with both disks so that its axis, normally lying in a plane including the disk axis and roller center, may be shifted out of said plane and may also change its angular relation to the disk axis; means for forcibly shifting said roller axis out of said plane, said means comprising a first part movable substantially in said plane and a second part movable bodily transversely of said plane arranged to apply force to the roller; an inclined plane device intermediate said parts to translate the movement of said first part to the second part.

23. In friction gearing, a driving and driven disk in axial alinement; a supporting means including an arm, a first part pivoted to the arm, a second part movable transversely of said first part, an inclined plane connection between said first and second parts; a roller in tractive contact with said disks, a universal bearing between said first part and the roller, and a bearing between said second part and said roller, and means to move said first part on its pivot.

24. In frictional gearing the combination of a casing for the gearing, two coaxial disks having concave annular friction surfaces facing each other, a roller in driving relation with both of said disks, an arm fixed to the casing, a supporting part for the roller pivoted to said arm within the roller, a control means connected to the supporting part for moving it on its pivot and means actuated by movement of said pivoted supporting part for inclining the rollers about an axis intersecting its points of contact with said disks.

25. In frictional gearing, coaxially arranged disk-like driving and driven members, at least one intermediate roller member between said driving and driven members, supporting means for said roller member including an arm, a supporting part pivoted to the arm within the roller, and means cooperating therewith adapted to incline said roller about an axis passing through the points of contact of said intermediate member with said driving and driven members to thereby vary the gear ratio, and a rotatable central control device disposed concentrically with respect to the axis of the disk-like members and connected to said pivoted supporting part for moving it on its pivots and thereby moving said means cooperating therewith to incline said roller as described.

26. In friction gearing, the combination of a casing, two axially alined shafts journaled therein; two axially spaced alined end disks with toric raceways mounted within the casing on one of said shafts to rotate therewith; an intermediate double faced disk-like member having toric raceways disposed between said end disks coaxial with and rotatable around the shaft with which said end disks rotate; a direct coupling member connecting said intermediate disk-like member to the other shaft; intermediate transmission rollers between said intermediate disk-like member and the two end disks adapted to transmit power between them; said coupling member inclosing one of said end disks and the rollers between it and the intermediate disk-like member; supporting means for the rollers comprising a hub fixed to the casing and disposed concentrically of the shaft axis within the intermediate disk-like member, said hub being provided at each end with arms and supporting parts on which the rollers are mounted, and means for controlling the ratio adjustment of the rollers comprising a control sleeve concentric with the shaft and passing thru said intermediate disk-like member.

27. In friction gearing, the combination of a casing, two axially alined shafts journaled therein; two axially spaced alined end disks with toric raceways mounted within the casing on one of said shafts to rotate therewith; an intermediate double faced disk-like member having toric raceways disposed between said end disks coaxial with and rotatable around the shaft with which said end disks rotate; a direct coupling member connecting said intermediate disk-like member to the other shaft; intermediate transmission rollers between said intermediate disk-like member and the two end disks adapted to transmit power between them; said coupling member inclosing one of said end disks and the rollers between it and the intermediate disk-like member; supporting means for the rollers, means for controlling the ratio adjustment of the rollers comprising a control sleeve passing concentrically thru said intermediate disk-like member, and operator actuated means connected to the control sleeve between the intermediate disk-like member and the end disk not inclosed by the coupling member.

In testimony whereof I have signed my name to this specification.

BERNARD THOMSON.